Dec. 30, 1958 R. B. HARTMAN 2,866,359
SAFETY MEANS FOR FLYWHEELS
Filed Feb. 3, 1958

INVENTOR.
ROBERT B. HARTMAN

United States Patent Office
2,866,359
Patented Dec. 30, 1958

2,866,359

SAFETY MEANS FOR FLYWHEELS

Robert B. Hartman, Bridgeport, Conn., assignor to Remington Arms Company, Inc., Bridgeport, Conn., a corporation of Delaware Application February 3, 1958, Serial No. 712,944

7 Claims. (Cl. 74—609)

This invention relates in general to safety means for heavy machinery such as presses and the like having large rotating flywheels. Occasionally the crankshafts of such heavy machinery will break with the result that the heavy spinning flywheel having a great deal of stored energy is cast loose and can do a great amount of damage before the rotational energy is dissipated destructively in rolling and striking objects in its path.

It has not been practical to carry out a satisfactory method of inspection of the parts subject to continuous operation and therefore it is one object of this invention to provide a safety structure which encloses the rotating flywheels and supports them, in the event of a casualty such as a broken crankshaft, in a manner that not only restrains them from rolling about but dissipates the rotational energy with a minimum of wear and tear on the safety structure and no damage to other structure or personnel.

It is a further object to provide simple economical guard structure for supporting and restraining a loose flywheel which structure is effective to accomplish its purpose and has a long service life due to the efficient and improved means for keeping impacts and rotational frictional contacts of the rotating flywheel with the guard structure at an absolute minimum.

The objects are accomplished generally by providing a combination of rigid framework and rollers adjacent to the flywheel of heavy machinery arranged so that in the event of breakage of parts such as crankshafts which cause the flywheel to drop loose from the machine, the flywheel is engaged directly before it can move more than a short distance from its regular position and supported upon the rollers which permit the wheel to spin harmlessly while restrained in the framework until the flywheel energy is dissipated safely. The rollers permit the guard structure to be constructed of much lighter material than otherwise.

These and other objects, features and advantages of the invention will be more particularly described in the following specification, having reference to the drawing, in which.

Figure 3:
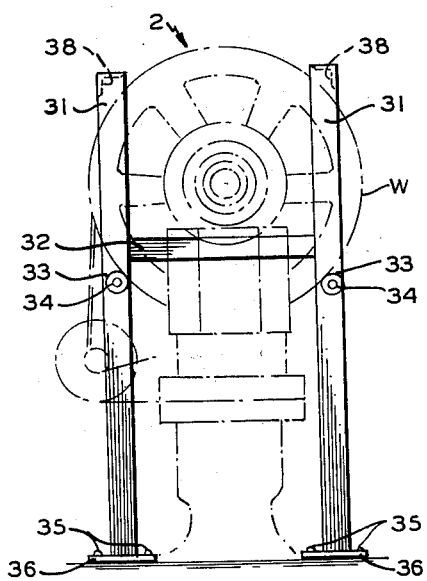
Figure 3 is a front view of a modified flywheel guard structure embodying the features of the invention and shown in operative position with respect to a different type of conventional press shown in dotted lines.
Figure 4:
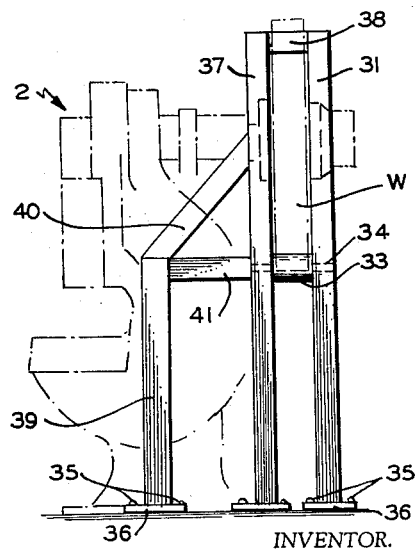

And Figure 4 is a side view of the guard structure and press of Figure 3.

Figure 1:
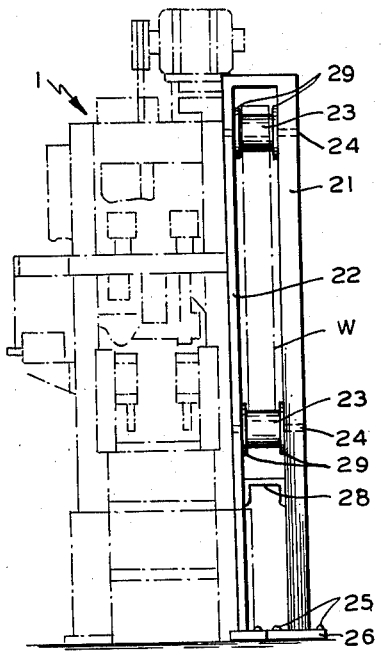
Figure 1 is a front view of a flywheel guard structure embodying the features of the invention, and shown in operative position with respect to a conventional press which is shown in dotted lines.
Figure 2:
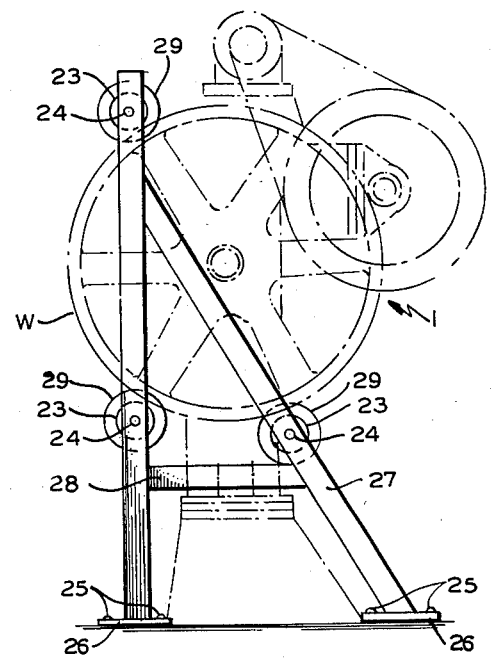
Figure 2 is a side view of the flywheel guard structure and the press shown in Figure 1.

The structure chosen to illustrate the features of the invention is shown in Figures 1 through 4. This structure generally consists of rigid upright frame members extending on both sides of the machine flywheel and bolted to the floor. Rotatably supported in the frame members are roller elements positioned adjacent the periphery of the flywheel to engage the same in the event it falls free from the machine in the event of a crankshaft failure or the like. In my preferred embodiment the rollers are provided with flanges for engagement with the sides of the flywheel. By means of this structure a loose spinning flywheel is restrained and supported without damage or injury until the rotational energy is dissipated. The safety structure as shown in Figures 1 and 2 consists of an A-frame which is of welded metal or other members of suitable strength. The A-frame is comprised of upright members 21 and 22 which are bolted to the floor by bolts 25 in flanges 26. Joined to upright members 21 and 22 by suitable method such as by welding are upright members 27 which are also similarly secured to the floor. A cross member 28 is provided to provide additional rigidity. Short shafts 24 are mounted in the frame as shown and rotatably support the flanged roller elements 23 adjacent the flywheel W. The rollers may be spaced from the flywheel a short distance or engaged frictionally therewith.

It can be seen that a loose flywheel will drop into position on the rollers and be restrained against rolling displacement as well as tipping over sideways. The frame structure with rollers can be much lighter than would be possible if an attempt were made to contain and restrain a loose and rapidly spinning heavy flywheel in a frame by direct frictional contact and friction.

The structure of Figures 3 and 4 show a similar application of the invention to a different type conventional press which necessitates a frame of somewhat different configuration to support the rollers in operative position. In this modification the rollers are in contact with the flywheel during operation and are rotated thereby.

The operation and features of the safety structure of this invention in the arresting and restraining safely heavy spinning flywheels to prevent the possibility of severe property damage and injuries to personnel is believed to be clear from the foregoing description with reference to the accompanying drawings.

While the particular embodiments of the present invention have been shown and described, it will be obvious to those skilled in the art that changes and modifications may be made without departing from this invention in its broader aspects and therefore the purpose in the appended claims is to cover all such changes and modifications as fall within the true spirit and scope of this invention.

I claim:

1. A safety assembly for a machine having a heavy flywheel said assembly comprising a supporting framework with portions adjacent both sides of the flywheel and a plurality of roller elements extending between said framework portions to rotatably support and restrain the motion of the flywheel in the event of a casualty resulting in said flywheel falling free of the machinery and safely dissipate the rotational energy of said flywheel.

2. In combination with a machine having a heavy flywheel, an upright frame structure having two side portions extending adjacent the sides of said flywheel, a plurality of shafts pulled to said flywheel axis extending through and between said side portions of the frame structure in circumferentially spaced positions around said flywheel, a roller rotatably mounted on each shaft adjacent to the periphery of said flywheel and radial flanges on each roller constructed and arranged to engage the sides of said flywheel upon its movement from its normal position.

3. A safety guard means for a machine having a heavy flywheel said guard means comprising a plurality of rotatable means constructed to engage the periphery and sides of said flywheel upon its deviation from its operative position and restrain said flywheel against all movement except rotational.

4. A safety guard for flywheels comprising frame structure means surrounding said flywheel and roller means mounted in said frame structure means to engage said periphery of said flywheel to permit rotation thereof while preventing displacement of the flywheel from its operational position.

5. A safety guard for flywheels comprising frame structure means surrounding said flywheel and roller means mounted in said frame structure means to engage said periphery of said flywheel to permit rotation thereof while preventing displacement of the flywheel from its operational position, said roller means having flange means to engage the sides of said flywheel for preventing lateral displacement of the flywheel from its operational position.

6. In combination with a machine having a heavy flywheel supported therein, a safety device comprising a rigid frame structure surrounding said flywheel to prevent displacement of said flywheel in the event of failure of the support therefor, and movable means mounted in said frame structure adjacent said flywheel in a position to be engaged thereby to rotatably support said flywheel in the event of deviation of said flywheel from its operative position.

7. A safety structure for machine having a heavy flywheel supported therein, said structure comprising rigid frame structure surrounding said flywheel but spaced therefrom, and roller means mounted in said frame structure in position between said frame structure and said flywheel to support and restrain said flywheel against substantial displacement from its operative position while permitting rotation of the said flywheel during said supporting and restraining function.

References Cited in the file of this patent

UNITED STATES PATENTS

| | | |
|---|---|---|
| 420,761 | Bettendorf | Feb. 4, 1890 |
| 1,438,729 | Vance | Dec. 12, 1922 |
| 2,504,947 | Grange | Apr. 18, 1950 |